(12) United States Patent
Lukschandel

(10) Patent No.: US 6,347,905 B1
(45) Date of Patent: Feb. 19, 2002

(54) CONNECTING ELEMENT FOR THE FRICTIONAL CONNECTION OF COMPONENTS

(75) Inventor: Jorg Lukschandel, Kempten (DE)

(73) Assignee: Elektroschmelzwerk Kempten GmbH, Munich (DE)

(*) Notice: Subject to any disclaimer, the term of this patent is extended or adjusted under 35 U.S.C. 154(b) by 0 days.

(21) Appl. No.: 09/417,165

(22) Filed: Oct. 12, 1999

Related U.S. Application Data

(63) Continuation-in-part of application No. 09/126,676, filed on Jul. 30, 1998, now abandoned.

(30) Foreign Application Priority Data

May 28, 1998 (DE) .......................................... 198 23 928

(51) Int. Cl.⁷ .................................................. F16B 2/00
(52) U.S. Cl. ................................. 403/404; 403/DIG. 2
(58) Field of Search .............................. 403/404, 373, 403/375, 376, 380, 345, DIG. 2

(56) References Cited

U.S. PATENT DOCUMENTS

| | | | | |
|---|---|---|---|---|
| 4,618,049 A | * | 10/1986 | Pflaum et al. | 192/107 M |
| 4,980,241 A | * | 12/1990 | Hoffmueller et al. | 428/607 |
| 5,049,165 A | * | 9/1991 | Tselesin | 51/295 |
| 5,137,792 A | * | 8/1992 | Hodes et al. | 428/614 |
| 5,348,210 A | * | 9/1994 | Linzell | 228/115 |
| 5,447,385 A | * | 9/1995 | Swars | 403/277 |
| 5,837,066 A | * | 11/1998 | Linzell | 148/22 |
| 6,020,072 A | * | 2/2000 | Woydt et al. | 428/472 |

FOREIGN PATENT DOCUMENTS

GB 1483124 * 8/1977

* cited by examiner

Primary Examiner—Harry C. Kim
(74) Attorney, Agent, or Firm—Collard & Roe, P.C.

(57) ABSTRACT

A connecting element for the friction-increasing connection of workpieces which are to be joined, which is a thin resilient element which bears particles of a defined size at its surface, the particles being made from a material with a compressive and shear strength which exceeds that of the workpieces to be joined.

13 Claims, 1 Drawing Sheet

CONNECTING ELEMENT FOR THE FRICTIONAL CONNECTION OF COMPONENTS

RELATED APPLICATIONS

This application is a continuation-in-part of Ser. No. 09/126,676 filed Jul. 30, 1998, now abandoned.

BACKGROUND OF THE INVENTION

1) Field of the Invention

The invention relates to an element for the frictional connection of components.

2) Background Art

Frictional connections are used in all sectors of mechanical engineering, often to transmit transverse forces or torque. The magnitude of the force which can be transmitted in each case depends, in addition to the design features, primarily on the coefficient of static friction (friction coefficient) of the component surfaces which are joined to one another. Steel/steel pairings typically have friction coefficients of 0.15, which is frequently insufficient to provide a reliable frictional connection given the increasingly rising demands placed on machine components.

Measures for increasing the friction coefficient, e.g. in shrink joints, have been known from the very early times of mechanical engineering; for example, as early as 1860 it was recommended to introduce sand in the joint gap, in order to improve the seating of gearwheels on shafts. The grains of sand are pressed into the surfaces of the components to be joined together under the effect of the shrink forces and bring about a certain form fit, with sand grain penetration depths of a few tenths of a millimeter. In practice, however, it is difficult to incorporate loose particles or particles which have been mixed in a spreadable carrier media evenly into the joint gap.

Although this method is effective in principle, the effect of relatively coarse particles in the joint gap entails an increased risk of long-term fracture. If the prevailing operating conditions indicate that such a risk exists, the impressions which the particles, used for force transmission, make in the component surfaces must not be significantly deeper than the peak-to-valley heights caused by prior machining.

Various methods are known for incorporating hard particles uniformly and reproducibly in a joint gap. DOS 23 64 275 of 07.10.1975 (corresponds to GB 1,483,124) describes the application of a layer containing hard-material bodies onto one of two interacting surfaces by vapor deposition, spraying on, sintering on or diffusion of a foreign material into the component surface.

In "ant-Antriebstechnik [Drive Engineering]" 20, No. 1–2, January–February 1981, Peeken, et al propose surface layers, for the frictional transmission of moments, which are produced using an electrodeposition method by jointly depositing fine grains of hard material and a metallic binding phase. By means of such layers, the static friction of a shaft-hub shrink joint is more than doubled. These layers even allow the friction coefficients under rotating flexural loading to be even better than under purely static loading.

The measures described to date for increasing the static friction coefficient are all based on directly covering one of the two components to be connected with friction-increasing layers. However, in practice, the desired coating often cannot be applied to either of the two components for process engineering reasons.

Swiss Patent Specification 192 197 discloses paper or linen as flexible carrier material for a layer containing grains of hard material and applied on both sides. Described as an active mechanism for increasing the adhesion is a mechanical pushing of wedge-shaped particles of hard material one above another by means of relative movement of the components to be connected. JP 6-147206 also discloses paper or linen as a flexible carrier material for grains of hard material. The connecting elements named in the documents are not capable of transmitting high transverse forces. They are therefore unsuitable for many applications.

DE 31 49 596 A1 discloses a connection which is produced by using coarse grains of hard material. A description is given of the use of an elastic supporting film which is made from a deformable material and does not itself participate in the transmission of force. It is disadvantageous that this connection is not detachable and therefore does not permit a reversible connection of the workpieces to be joined together.

The present invention is based on the object of providing a friction-increasing reversible connection, which is free from play, between workpieces to be joined together, which connection avoids the drawbacks of the prior art.

SUMMARY OF THE INVENTION

This object is achieved according to the invention by means of a connection element which comprises a thin, resilient film with an inherent strength which is at least as high as the inherent strength of the workpieces to be joined together, the resilient film bearing particles of defined size at its surface and these particles consisting of a material with a compressive and shear strength which exceeds that of the workpieces to be joined together The particles of a material with a compressive and shear strength which exceeds that of the workpieces to be joined together are referred to herein as hard particles. Thin films are preferably to be understood as meaning films with a thickness of $\leq 0.2$ mm.

The connecting element according to the invention, which is also referred to as friction film/foil below has the following advantages over known frictional connections:

a) the difficulties associated with only a partial coating of relatively large or bulky components do not occur;

b) it permits the reversible connection of components which are not suitable for direct coating, even in cases where large transverse forces occur;

c) the friction coefficient of frictional connections is increased by at least 50%, usually even 100–200%;

d) it is economical to produce;

e) it is easy to adapt even to joint surfaces with a complex shape or to non-planar joint surfaces;

f) it does not require any significant additional expenditure during assembly

BRIEF DESCRIPTION OF THE DRAWINGS

The single drawing is a view in cross-section of a thin metal film carrying hard particles on two sides.

DETAILED DESCRIPTION OF THE INVENTION

Figure 1:
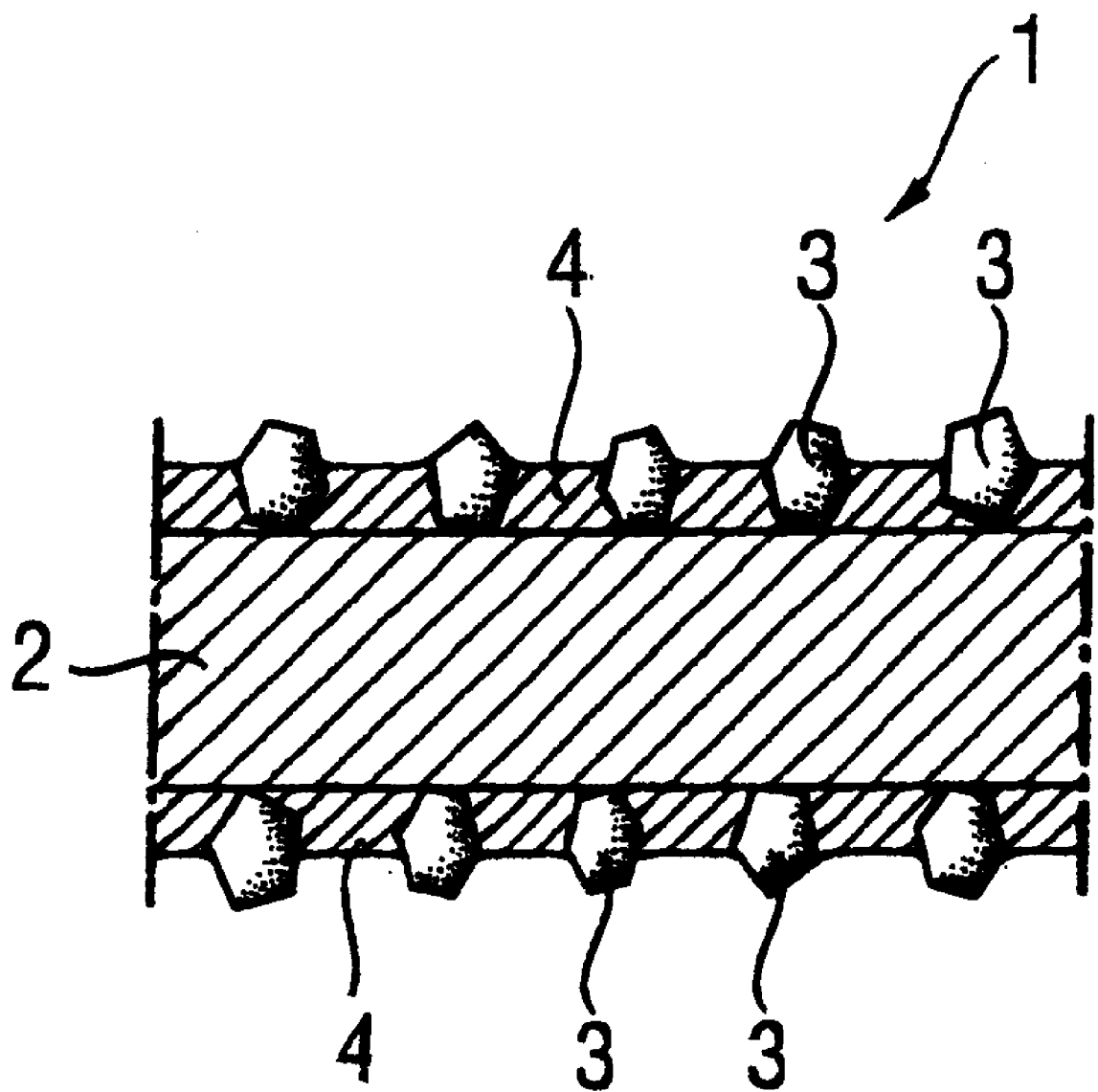

The hard particles preferably consist of a material which, under the particular conditions of use, does not react chemically either with the materials of the components to be joined together or with environmental media. It is preferably an inorganic material.

Preferably, the hard particles are selected from the group consisting of hard materials. Examples of hard materials are carbides such as SiC, WC and $B_4C$, nitrides such as $Si_3N_4$ and cubic BN, borides, $SiO_2$, $Al_2O_3$, and diamonds.

The size of the hard particles is selected in such a way that the damage to the joint surfaces caused by the particles being pressed into the surface does not reach an impermissible level. Preferably, this is ensured if the particle diameter is not greater than about three times the peak-to-valley height of the joint surfaces, which peak to valley results from machining of the joint surfaces. A particle size with a maximum diameter of about 0.1 mm generally fulfils this requirement. Preferably, hard particles with a maximum diameter of about 15 μm are used.

Ideally, the hard particles are of identical size. However, this is technically impossible to achieve within the preferred grain size range. Several of the above-mentioned preferred hard materials are commercially available in very narrow grain size ranges in which the scatter about a given nominal diameter amounts to no more than about ±50%. This is the case in particular with diamond and cubic BN and to a limited extent also with $Al_2O_3$, SiC, $B_4C$. Such grains within the size ranges are preferred as hard particles in the component according to the invention. From the diameter range of up to about 15 μm which is suitable, it is preferred to select commercially available grain size ranges of 6 μm or 10 μm average diameter.

The number of hard particles per unit surface area of the contact surfaces of the components to be joined together is preferably selected in such a way that the normal force which is available for joining the components together is sufficient to ensure that the particles are pressed into the opposite surface. This will generally be the case if no more than about 30% of the surface of the friction film/foil is covered with hard particles.

An insufficient covering leads to the hard particles being pressed completely into the joint surfaces and direct contact between the metal of the joint surfaces occurs with the risk of so-called "fretting" rust being formed which can reduce the force which can be transmitted. This is the case if less than 3% of the friction film/foil is covered with particles.

Preferably, friction film/foils are designed in such a way that the particles embedded therein cover about 5 to about 15% of the friction film/foil. Such a multilayer friction film/foil is illustrated in FIG. 1.

The thin flexible film (1) with an inherent strength at least as high as the inherent strength of the workpieces to be joined together is preferably formed from a strip made of metallic material (2) for example as a cold-rolled spring strip, on which the hard particles (3) are fixed by means of a binding phase (4).

In this case, the binding phase is preferably applied to the thin, flexible film by means of electrodeposition methods. The hard particles are in contact with the surfaces to be joined together and the force is transmitted by means of an interlayer of sufficient inherent strength.

Highly stressed frictional connections are generally metallic components predominantly made from iron materials, with the result that the requirement for "sufficient strength" of the carrier material is likewise essentially fulfilled only by steel. The further requirements for coatability, flatness, plane parallelism, flexibility and elasticity are fulfilled satisfactorily by strip steel, in particular, spring strip steel. For the preferred embodiments of friction film/foil coated on both sides, use is therefore made of commercially available unalloyed spring strip steel preferably with a thickness of 0.1 mm.

The fixing of the force-transmitting particles on the carrier material must be sufficiently stable in order to be able reliably to transmit transverse forces to be expected. The binding phase required for this purpose must therefore, like the carrier material, have a strength which corresponds at least to that of the surfaces to be joined together.

Various methods customary in coating technology come into consideration for applying the binding phase with the hard particles. Thus, for example, an organic material, for example a lacquer, in which the required quantity of particles are homogeneously dispersed, can be spread in a simple way by means of a doctor blade onto the surface of the carrier material, in order to produce there a uniform, thin film from which the particles project after drying. Since it is predominantly metallic components which are used in mechanical engineering, the strength of an organic binding phase is mostly insufficient. It is therefore usually necessary to choose a metallic binding phase for fixing the hard particles on the surface of the carrier material.

In this case, the hard material/metal layer is preferably produced by means of electrodeposition processes, e.g. an external current-free (=chemical) nickel plating. Such processes are known and are described, for example, in the literature references which have already been mentioned. The chemical nickel layers applied to the resilient flexible material can be hardened by means of a heat treatment at up to about 400° C., with the result that the adhesion to the flexible material is improved and the inherent hardness of the layer is increased.

In principle, the components according to the invention can be used as friction films/foils in any type of frictional connection throughout the field of mechanical engineering, and in particular, if the forces which can be transmitted by the component surfaces which are imposed by the design are insufficient. This may be the case in particular with clamp or press joints in the presence of lubricants, but may quite possibly also apply to dry pairings.

EXAMPLE 1

Production of a Connecting Element According to the Invention

The connecting element is an annular plate of steel foil which is 0.1 mm thick and is coated on both sides. The friction-increasing coating consists of diamond particles with an average diameter of 6 μm in a binding phase of chemical nickel in a layer thickness of 4 μm. The coverage density of the foil surface with diamond particles amounts to 7 area %.

To produce this connecting element, firstly, an annular plate of the required dimensions is punched from uncoated spring steel sheet with a thickness of 0.1 mm. Although in principle it is possible to produce such plates from sheet metal which has already been provided with a friction-increasing coating on both sides, this causes a very large amount of expensive waste owing to scrap. Usually, a relatively large number of plates are treated simultaneously.

The prepared plates are placed on suitable mounts and are pretreated in accordance with the general rules of electrodeposition by degreasing, pickling and activating.

Then, the carrier bearing the plates is immersed in a chemical nickel bath in which diamond powder with an average particle diameter of 6 μm is dispersed. The quantity of dispersed diamond powder is selected in such a way that under the parameters prevailing in the coating bath (bath movement, deposition rate), the desired proportion of diamond in the deposited layer of metal is achieved and the metal layer reaches the desired thickness of slightly more than half the diameter of the diamond particles Under customary process conditions, the immersion time amounts to approximately 15 minutes.

The carrier comprising the plates which are now coated, is then removed from the coating bath and is cleaned in an ultrasonic bath, in order to remove diamond particles which are only loosely attached.

The cleaned plates are taken off the carrier and are subject to a heat treatment for 2 hours at least 150° C. This treatment increases the adhesion of the chemical nickel layer to the steel foil and the seating of the particles in the layer itself.

EXAMPLE 2

Use of a Connecting Element in Accordance with Example 1

A gyrating mass made of cast iron is to be attached at the end side to a rotating shaft made of heat-treated steel. It is not possible to achieve a form-fitting connection by means of wedging since precise positioning takes place only during assembly. Attachment is carried out using a central screw which allows a normal force of 16,000 N. The presence of lubricants at the contact surfaces is not to be ruled out. The holding momentum required amounts to 500 Nm, but only 350 Nm (dry) or 240 Nm (lubricated) are achieved.

By inserting a connecting element in accordance with Example 1, a holding momentum of 540 Nm is achieved at the available normal force of 16,000 N. In order, with the given structure, to allow the foil to be inserted, the latter has to be bent elastically.

I claim:

1. An independent connecting element for a friction increasing reversible connection of workpieces each having a face which are to be joined together at the face, said element comprising opposite contact surfaces with each surface comprising a thin, resilient film with an inherent strength which is at least as high as the inherent strength of the workpieces to be joined together, the resilient film bearing particles of defined size on said surfaces and these particles consisting of at least one material selected from the group consisting of carbides, borides, nitrides, $SiO_2$, $Al_2O_3$ and diamond and which has a compressive and shear strength which exceeds that of the workpieces to be joined together.

2. The connecting element as claimed in claim 1 wherein the particles consist of a material which, under the particular conditions of use, does not react chemically either with the materials of the workpieces to be joined together or with environmental media.

3. The connecting element as claimed in claim 1 wherein the deviation of the particles about a given nominal diameter does not exceed ±50%.

4. The connecting element as claimed in claim 1 wherein about 3% to 30% of the surface of the film is covered with the particles.

5. The connecting element as claimed in claim 1 wherein the particles cover 5 to 15% of the film.

6. The connecting element as claimed in claim 1 wherein the thin, resilient film is formed as a strip of sufficient inherent strength, on which the particles are fixed by means of a binding phase.

7. The connecting element as claimed in claim 1, wherein the materials are selected from the group consisting of SiC, WC, $B_4C$., $Si_3N_4$, cubic BN.

8. A method for producing a connecting element which joins a workpiece with another workpiece as claimed in claim 1, which comprises applying by a plating technique to the contact surfaces of a thin resilient film with an inherent strength which is at least as high as the inherent strength of the workpieces to be joined together, particles of a defined size consisting of at least one material selected from the group consisting of carbides, borides, nitrides, $SiO_2$, $Al_2O_3$ and diamond.

9. The method as claimed in claim 8 wherein the deviation of the particles about a given nominal diameter exceeds more than ±50%.

10. The method as claimed in claim 8 wherein the number of particles per unit surface area of the contact surfaces of the components to be joined together is selected so that the normal force which is available for joining the components together is sufficient to ensure that the particles are pressed into the opposite surface.

11. The method as claimed in claim 8 wherein about 3% to about 30% of the film is covered with the particles.

12. The method as claimed in claim 8 wherein the particles cover about 5 to about 15% of the film.

13. The method as claimed in claim 8 wherein the thin, resilient film is formed as a strip of sufficient inherent strength, on which the particles are fixed by means of a binding phase.

* * * * *